March 31, 1925.
L. H. WHEELER
VACUUM TANK CONSTRUCTION
Original Filed Feb. 17, 1923
1,531,773
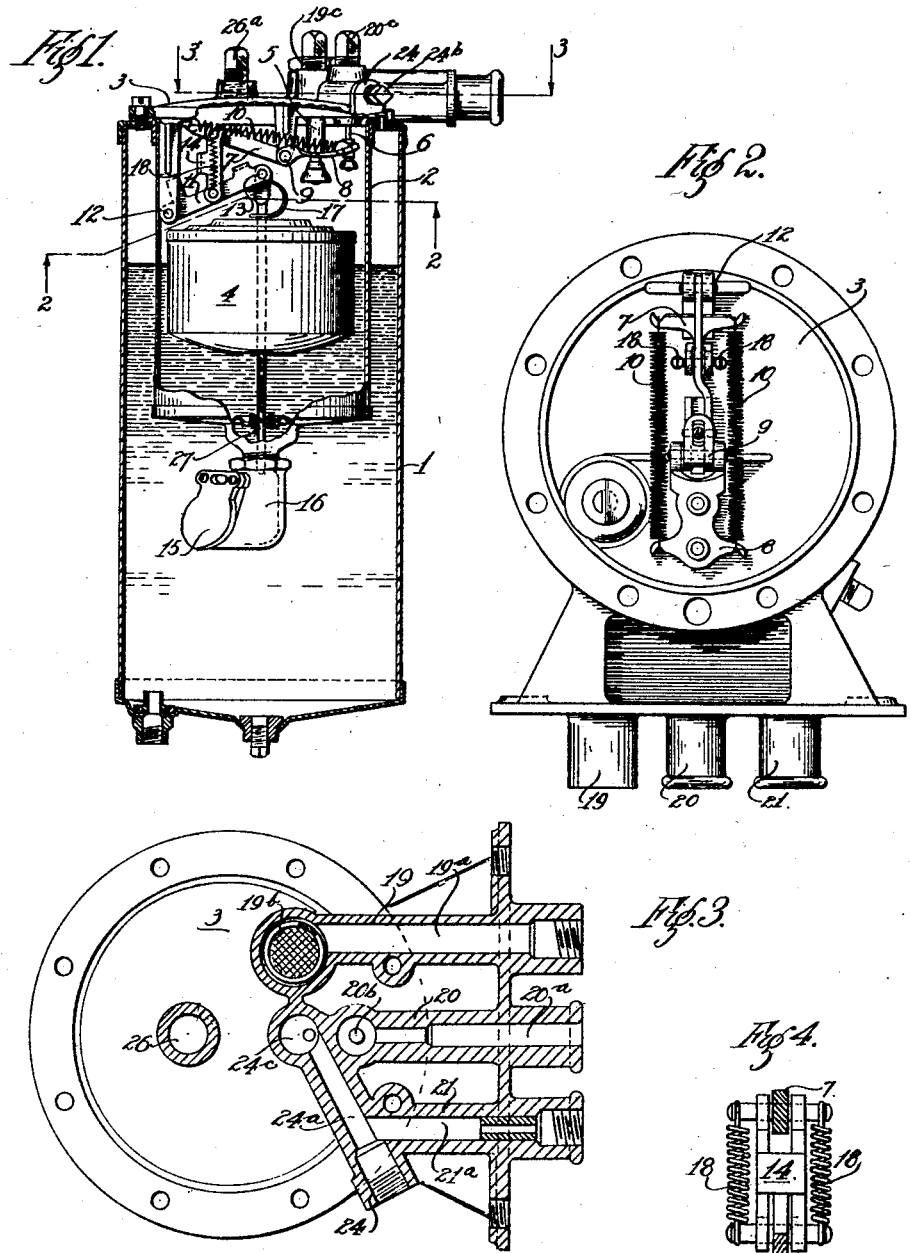
INVENTOR.
Leonard H. Wheeler.
By his Attorneys.

Patented Mar. 31, 1925.

1,531,773

UNITED STATES PATENT OFFICE.

LEONARD H. WHEELER, OF CHICAGO, ILLINOIS, ASSIGNOR TO STEWART-WARNER SPEEDOMETER CORPORATION, OF CHICAGO, ILLINOIS, A CORPORATION OF VIRGINIA.

VACUUM-TANK CONSTRUCTION.

Application filed February 17, 1923, Serial No. 619,621. Renewed February 12, 1925.

*To all whom it may concern:*

Be it known that I, LEONARD H. WHEELER, a citizen of the United States, residing in the city of Chicago, in the county of Cook and State of Illinois, have invented certain new and useful Improvements in Vacuum-Tank Constructions, of which the following is a specification, reference being had to the accompanying drawings forming a part thereof.

The purpose of this invention is to provide an improved construction of vacuum tanks for the specific purposes of cheapening the cost of the principal casting part and avoiding the annoying rattling which is experienced in the construction in common use which results from the jar of the vehicle on which the tank is mounted in service. It consists in the elements and features of construction shown and described as indicated in the claims.

In the drawings:—

Figure 1 is a vertical axial sectional view of a vacuum tank embodying this construction, the cap plate being shown in edge elevation partly broken away.

Figure 2 is a section at the line 2—2 on Figure 1.

Figure 3 is a section at the line 3—3 on Figure 1.

Figure 4 is a section at the line 4—4 on Figure 1.

The construction shown in the drawings is in general of familiar character comprising the outer tank member, 1, the inner vacuum chamber member, 2, and the cap plate, 3, which secures together and closes the top of both inner and outer tank members and contains the several fluid leads to the vacuum chamber. Within the vacuum chamber there is shown the customary float, 4, for operating the suction-controlling valve, 5, and atmosphere valve whose stem is shown at 6 with the snap action connections between the said valves consisting of levers, 7 and 8, having a fulcrum in common at 9 and connected by the parallel snap springs, 10, 10; the lever, 11, having a fixed fulcrum at 12 connected to the float stem at 13 and connected by parallel links, 14, 14, to the lever, 7. The outlet from the vacuum chamber to the main chamber is shown obtained in the usual manner past the check valve, 15, closing the outlet fitting, 16, and seating by gravity but at nearly vertical position. It has been found that the vibration of the vehicle causes rattling at the following points in the construction shown,— (*a*) at the valve, 15, which is so nearly vertical at seated position that when the tank is full and the suction is cut off and the discharge past the check valve is very slow only answering to the requirements of the engine, this valve, 15, being relieved of the suction for holding it on its seat vibrates against its seat unpleasantly; (*b*) under all conditions, except when the vacuum chamber is full to the maximum, or empty to the low level, there is very slight pressure at the pivot of the float stem to the lever, 11, and similarly slight pressure, or no pressure, at the pivots of the links, 14, to the lever, 11, and to the lever, 7, and rattling occurs at these three points.

The rattling of the valve, 15, on its seat is prevented by making this valve of non-metallic material, as for example fiber or phenol composition such as "bakelite", which while not preventing the vibration of the valve, permits it to occur without being audible. At the pivot of the float stem to the lever, 11, the rattling is prevented by a bow spring, 17, sprung as shown in Figure 1 between the top of the float and the under side of the member, 11. At the connections of the links, 14, to the levers, 11 and 7, the rattling is prevented by coil springs, 18, 18, connected to the pivots of the links to the two levers respectively stressing them toward each other and thereby holding them snugly at their seats in the links.

In order to keep the cap plate, 3, within the minimum vertical dimensions as desirable for certain reasons relative to convenience of mounting and for the further and more important purpose of facilitating the manufacture of this member of the vacuum tank by die casting process, all the fluid leads are arranged in parallel and in the same horizontal plane,—transaxial to the tank chambers,—and for this purpose the said cap plate comprises three horizontal bosses, 19, 20 and 21, extending beyond the circumference of the cap plate and axially cored as seen in Figure 3. The core duct, 19ª, in the boss, 19, which constitutes the fuel inlet connecting its inner end with the vertical bore, 19$^b$, leading to the fuel inlet port in the vacuum chamber, said bore, 19$^b$, being closed at the upper end by a plug, 19$^c$, the core duct, 20$^a$, in the boss, 20, which constitutes the atmosphere inlet connecting its inner end with the vertical bore, 20$^b$, leading to said atmosphere inlet port and closed at its upper end by the plug, 20$^c$, the core duct, 21$^a$, in the boss, 21, which constitutes the suction connection connects at its inner end with the bore, or core duct 24$^a$, in an oblique boss, 24, closed at the outer end by a plug, 24$^b$, and at its inner end connecting with the bore, 24$^c$, which leads to the suction port controlled by the valve, 5. 26 is a priming aperture closed by the plug, 26$^a$. The construction shown and thus described facilitates the production of the cap plate by die casting process because the cores for producing the core ducts, 19$^a$, 20$^a$ and 21$^a$, being parallel in the same transaxial plane may be operated simultaneously by the same operating part of the die casting machine, the construction of which for the purpose is thereby simplified and the accuracy of the product insured.

In this construction the rattling which is liable to occur at the guide bearing of the float stem shown at 27 is prevented by making the said guide bearing consist of a bushing as shown of relatively light non-metallic material such as bakelite or fiber.

I claim:—

1. In a vacuum fuel feeding device having valve means for controlling the alternation of dominance of suction and atmospheric pressure in the vacuum chamber, said means comprising a float and two levers and an inextensible link which connects them constituting the connection from float to valve, springs connecting the link-connected levers at the pivots of the link connections; whereby the slack at the pivots at both ends of the links is at all times taken up by the springs and rattling at said pivots is prevented.

2. In a vacuum fuel feeding device having valve means for controlling the alternation of dominance of suction and atmospheric pressure in the vacuum chamber, said means comprising a float and two levers and an inextensible link which connects them constituting the connection from float to valve, springs reacting between the two parts joined at the respective pivotal connection stressing them oppositely with respect to the pivots, whereby the slack of the pivots is at all times taken up and rattling prevented.

3. In a vacuum fuel feeding device having a float for operating the valves to control the alternation of dominance of suction and atmospheric pressure, and lever connections from the float to the valves for that purpose, a spring reacting between the float and the immediate lever connection thereto for stressing the connected parts against the pivot to prevent rattling thereat.

In testimony whereof, I have hereunto set my hand at Chicago, Illinois, this 8th day of February, 1923.

LEONARD H. WHEELER.